Figure 6:
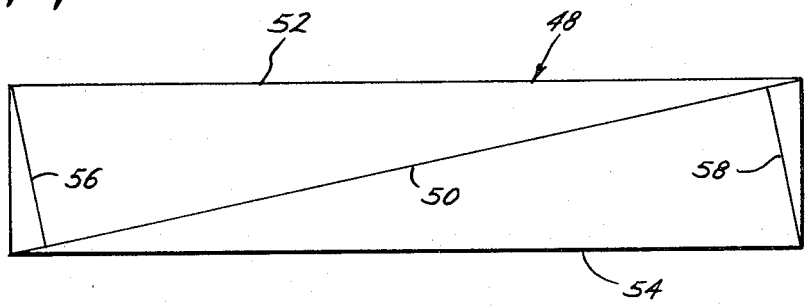

March 5, 1968　　　C. R. HOLT ET AL　　　3,372,075
METHOD OF MAKING AN INSULATED STORAGE TANK
Filed March 6, 1964　　　3 Sheets-Sheet 1
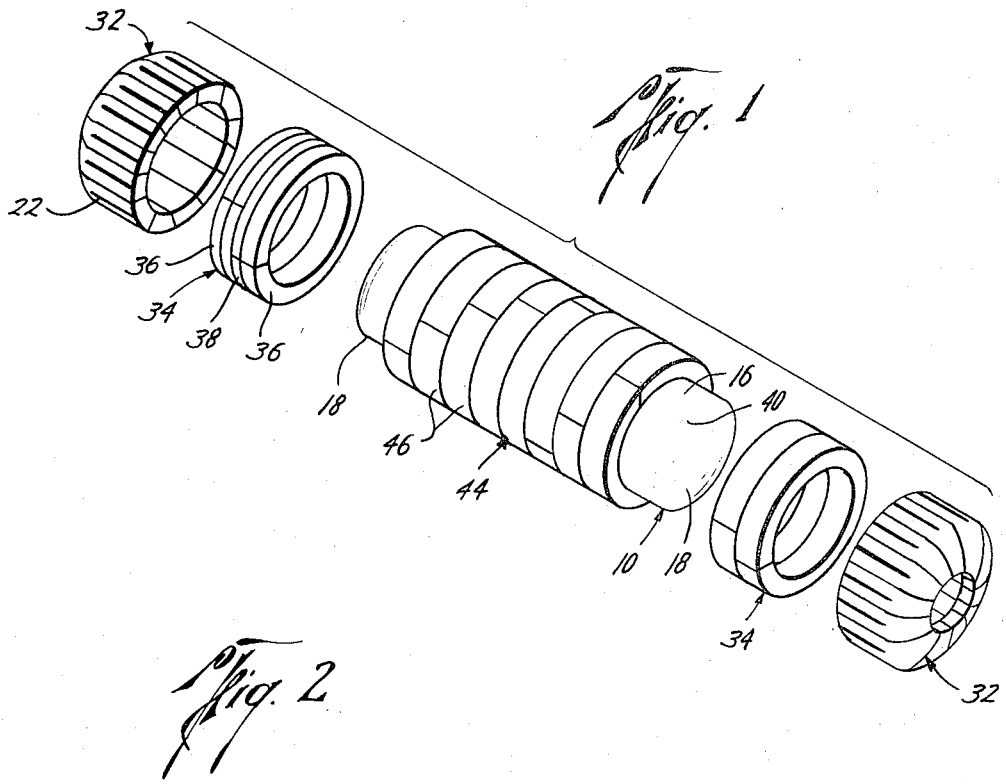
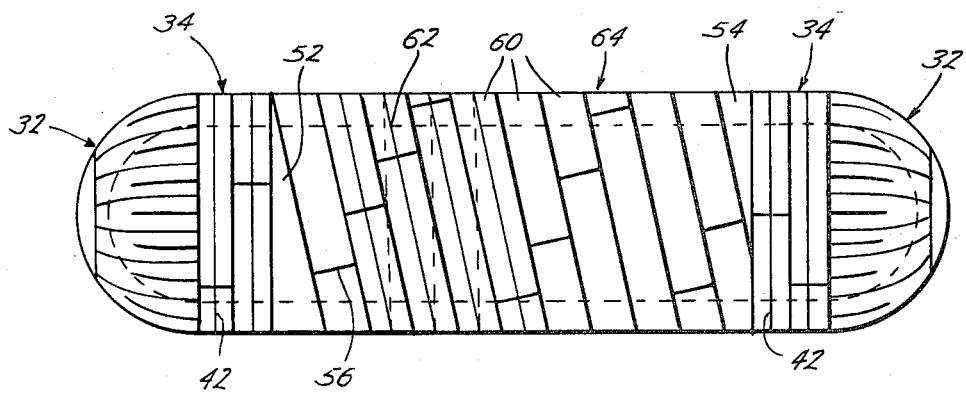
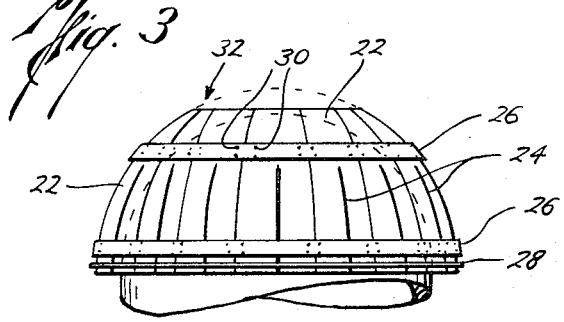
Charles R. Holt
Ray A. Madewell
INVENTORS
BY James F. Weiler
Jefferson D. Giller
William A. Stout
Paul L. DeVerter II
ATTORNEY March 5, 1968   C. R. HOLT ET AL   3,372,075
METHOD OF MAKING AN INSULATED STORAGE TANK
Filed March 6, 1964   3 Sheets-Sheet 2
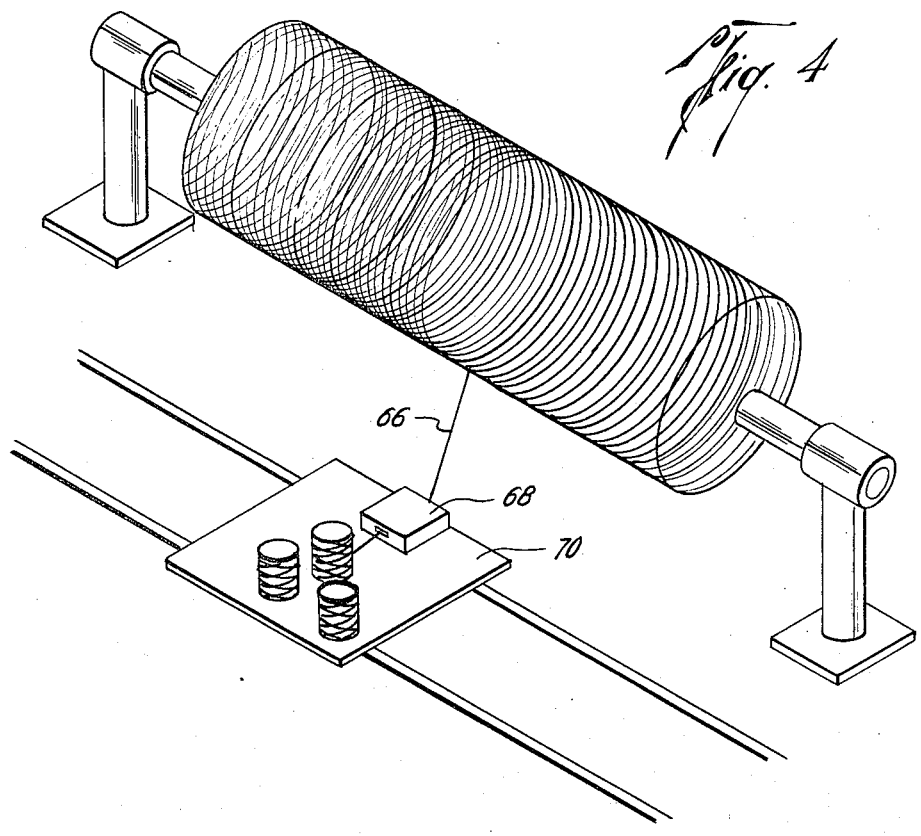
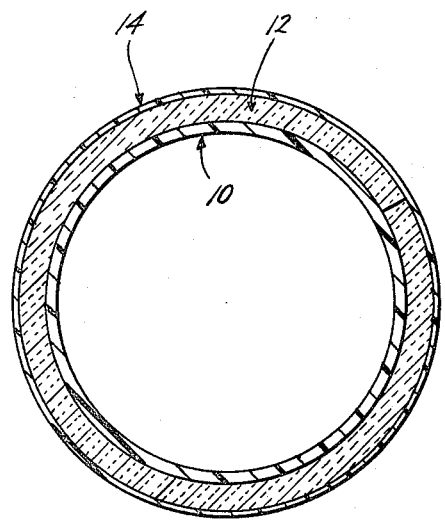
Charles R. Holt
Ray A. Madewell
INVENTORS
BY
ATTORNEY March 5, 1968 C. R. HOLT ET AL 3,372,075
METHOD OF MAKING AN INSULATED STORAGE TANK
Filed March 6, 1964 3 Sheets-Sheet 3

Charles R. Holt
Ray A. Madewell
INVENTORS

BY
ATTORNEY

3,372,075
METHOD OF MAKING AN INSULATED STORAGE TANK

Charles R. Holt, Norman, and Ray A. Madewell, Ardmore, Okla., assignors, by mesne assignments, to Amercoat Corporation, Brea, Calif., a corporation of California
Filed Mar. 6, 1964, Ser. No. 349,807
16 Claims. (Cl. 156—172)

The present invention relates to a method of manufacturing an insulated storage tank, and more particularly relates to a method of manufacturing an insulated storage tank using sandwich construction.

With the advent and greatly increased usage of plastic resin reinforced with glass fibers, many attempts have been made to design and construct a suitable storage tank which would incorporate the strength of the glass fiber with the corrosion resistance of the plastic resin. By helically winding resin impregnated glass fibers, a relatively large storage tank may be provided which takes advantage of the relatively high tensile strength of the glass fibers and provides a storage tank having a strength to weight ratio greater than steel. However, because the tanks heretofore made have been relatively thin it has been desired to increase their insulating properties as well as their strength. In order to provide this increased insulation and strength, it has been found that the sandwich type construction will provide a greatly improved tank for filling these requirements.

Therefore, it is a primary object of the present invention to provide a storage tank utilizing helically wound glass fibers bonded with a suitable resin for inner and outer shells and having a suitable insulating material positioned therebetween.

A still further object of the present invention is the provision of a method of making an insulated storage tank of sandwich construction wherein a suitable insulating material is conformed to the outer surface of a helically wound bonded inner glass fiber shell and an outer shell is formed under tension over the insulating material to make a tight, firm sandwich type construction storage tank.

A still further object of the present invention is the provision of a method of making an insulated storage tank wherein the inner shell is formed by helically winding resin impregnated glass fibers to form a cylindrical section and at least one arcuate dome end section, curing the inner core to an intermediate cure only if the insulating material is to be a plain or foam filled honeycomb type modular cell or glass fiber, but in the case of using insulation such as polyurethane foam curing the inner shell fully as this material may create vapors when heated causing material separation, attaching a layer of insulation over the inner shell, and under tension helically winding a resin impregnated glass fiber forming an outer shell over the insulation to bond the insulation to both shells and tightly against both shells, and thereafter fully curing the tank in an oven if the honeycomb type insulation is used, but curing at ambient temperatures if the vapor-creating insulation is used.

Yet a still further object of the present invention is the method of making a storage tank utilizing glass fibers bonded with a suitable resin for the inner shell and outer shell and providing an interior layer of insulating material which is helically wound onto the inner shell.

Yet a still further object of the present invention is the provision of a method of making an insulated storage tank of sandwich construction wherein an inner shell is provided by helically winding a resin impregnated glass fiber into a cylindrical section and at least one dome section, forming an inner core of insulating material to fit over the dome, forming a short cylindrical section which is bonded to the dome shaped core section for placement on the inner shell and attached to the inner shell by winding a band of fibers around the short cylindrical section, attaching insulation about the cylindrical section of the inner shell and supporting it by banding it with glass fibers, and helically winding a resin impregnated glass fiber outer shell under tension over the insulation on both the cylinder and the dome section.

A still further object of the present invention is the provision of a method of making an insulated storage tank of sandwich construction having inner and outer helically wound glass fiber shells formed into a cylindrical setting and at least one end dome section with an insulation material in between wherein the insulation to be placed in the end dome is preformed into a dome shape with a plurality of insulation segments which are nonrigidly joined together so that the insulation dome will be flexible and can be easily but firmly positioned against the inner shell when the outer shell is wound over the end dome insulation under pressure thereby insuring that the insulation is down on and supporting the inner shell.

Yet a further object of the present invention is the provision of a method of making an insulated storage tank of sandwich construction having inner and outer helically wound glass fiber shells forming a tubular section having preformed flat end sections wherein a premolded inner end is bonded to the tubular shell, insulation material is bonded to the inside of an outer premolded end, coating the outside of the inner end with resin, and attaching the insulation and outer end over the inner end.

Figure 7:
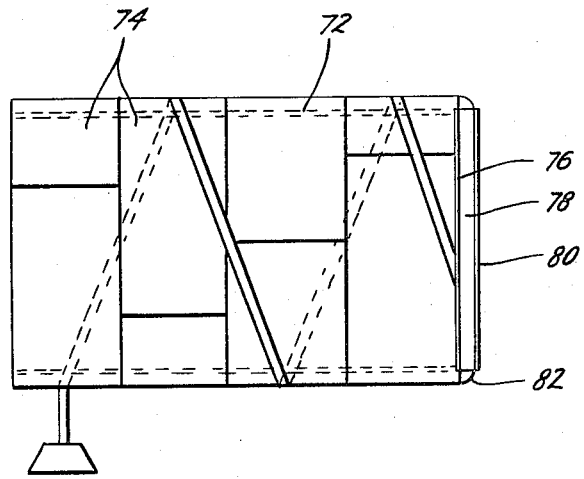

Other and further objects, features and advantages will be apparent in the following description of the method of the present invention, given for the purpose of disclosure, and taken in conjunction with the accompanying drawings where like character references designate like parts throughout the several views and where, FIGURE 1 is an exploded perspective view illustrating various steps in the method of manufacturing an insulated storage tank according to the present invention, FIGURE 2 is an elevational view of a storage tank showing the attachment of insulation over the inner shelf, FIGURE 3 is a fragmentary elevational view of one of the dome ends showing the method of performing the insulation for a dome end, FIGURE 4 is a perspective view, partially schematic, illustrating the method of forming the outer shell of the storage tank of the present invention, FIGURE 5 is a cross-sectional view of a finished storage tank, FIGURE 6 is an elevational view of a strip of insulation illustrating the method of preparing transitional pieces, and FIGURE 7 is an elevational view of a tank having a flat end in the process of being manufactured.

As previously mentioned, high strength is obtained from the continuous properties of glass fibers when they have been helically wound and impregnated with a suitable resin such as epoxy. The resulting tank is stronger and lighter than steel tanks of the same thickness and has a thermoconductivity of only 1% of that of steel. However, since the filament wound plastic tanks generally have a thin shell thickness, it is desirable for some uses to provide additional insulation, and in some instances such as for use under pressure, it is desirable to increase their strength. The present invention provides a method of making a storage tank using sandwich construction wherein the inner and outer shell is comprised of a helically wound resin impregnated glass fiber and the core is of a suitable insulating material. While it would in some instances be satisfactory to merely place a suitable rolled or board type insulation, for example, polyurethane foam or glass fiber insulation around an inner shell and omit the outer shell, the outer shell is useful in waterproofing the insulation and providing additional strength. However, to greatly increase the strength, a sandwich type construction utilizing a conventional honeycomb core material is preferable which provides a modular construction greatly increasing the strength of the tank and which entraps air in the honeycomb structure to increase the insulation. By adding to the wall depth, the sandwich type construction will add substantially to the rigidity and strength of the tank as compared to a single shell tank. The wall depth of the sandwich construction will take advantage of the high tensile strength of the glass fibers to provide beam strength and resistance against loads.

Referring now to the drawings, and particularly to FIGURE 5, it is to be noted that the insulated storage tank of the present invention generally consists of an inner shell 10, an insulating core 12, and an outer shell 14. As will be more fully described hereinafter, the inner and outer shells 10 and 14 are made by helically winding resin impregnated glass fibers, and the insulation 12 may be of any suitable rolled foam or fiber insulation or of a conventional honeycomb modular cell construction. Similarly, the end of the storage tank may be of the same construction or may be of a flat preformed plastic shell instead of the helically wound shells, all of which will be hereinafter described.

Referring now to FIGURE 1, the method of construction of an insulated storage tank is best seen wherein an inner shell 10 having a cylindrical or tubular portion 16 may be provided with one or more arcuate shaped or dome ends 18, here shown as two, which has been previously constructed by helically winding resin impregnated glass fibers as is conventional over a suitable mandrel or such as a deflatable mandrel, a mandrel which becomes part of the inner shell, or a washout mandrel. After the internal shell 10 has been constructed, it is ready for curing. However, it has been found that it is important to cure the internal shell in accordanc with the type of insulation that is to be used as the core of the sandwich construction. For example, if the sandwich construction is to be plain or foam filled honeycomb, or rolled or board type fiber, the inner shell 10 need not be completely cured as its curing process may be completed at the time the outer shell 14 is cured, which in the case of a honeycomb type insulation will be a complete oven cure as will be more fully described hereinafter. However, if the core 12 of the sandwich construction is to be of a rolled or board type insulation such as a foamed plastic material, for example, polyurethane foam, it has been found necessary to first cure the inner shell 10 to a full cure in an oven. The reason for this is that the completed storage tank cannot be fully cured in an oven after the application of the outer shell 14 as it has been found that the oven heat treatment when the foam plastic material is used creates vapors which cause a material separation in the finished product thereby causing weakness and failures.

Therefore, after the inner shell 10 is suitably cured the core insulation 12 is preformed and attached to the inner shell 10. Referring now to FIGURE 3, any suitable male form dome 20 may be used for preforming the insulation core for application over the dome ends 18. First, the insulating material is cut into a plurality of segments 22 as necessary for proper dome contouring. In order to suitably bend the segments about the rounded dome 20 it is preferable to cut a plurality, such as two slits 24, about half the thickness deep in each of the segments 22 running from the bottom end for about two-thirds of the length of the segments 22. Therefore, with the segments 22 positioned on the dome form 20 with the slits 24 facing outwardly the segments 22 will more easily contour themselves to the rounded dome 20. After the segments 22 are placed on the dome 20, dry glass fiber roving (not shown) is run from the base over the center and to the opposite base and is secured about the bottom with a temporary metal band 28. The segments are then joined together by a plurality of glass cloth strips 26 over the joints between adjacent segments 22. The glass cloth strips 26 are secured to adjacent segments 22 by a suitable resin 30 on either side of but not on or over the joints between adjacent segments 22. Thus, the segments 22 are joined together in a nonrigid manner so that when the outer shell 14 is wound over them under pressure they may be drawn tightly against both the inner and outer shells, which will greatly increase the structural strength of the sandwich construction, particularly when used with a honeycomb modular cell core. Thus, the dome section 32 of the core is prepared.

Next, a short cylindrical or tubular section 34 for each domed end is prepared by forming strips 36 of the insulation in a cylindrical form, preferably forming them over the end of the cylindrical section 16 of the inner shell 10. The strips 36 may be held in place with a few strands of glass fiber winding 38 and the joints at the ends of the strips 36 are suitably and conventionally bonded together with strips of glass cloth, resin and catalysts. The short cylindrical strips 34 are then bonded to each of the dome insulation sections 32. Preferably, this is done by placing the cylindrical forms 34 on the floor, placing the dome section 32 on top of the cylindrical sections 34 and bonding the joints together with a suitable glass cloth strip and resin. It is to be noted that in the event that the storage tank is constructed of only the cylindrical section 16 and one dome section 18 (the other end, usually the bottom, to be affixed by a bonding process) the supporting mandrel (not shown) on which the internal shell 10 is initially wound will be slightly tapered to assist in removing it at the finish of the process from the inner shell 10. In this event, in order to accurately preform the short cylindrical section 34 it is desired to preform it directly on the cylindrical portion 16 of the inner shell 10 starting at the tangent line 40 which is the line joining the cylindrical seection 16 with the dome section 18. Then the tangent line end of the cylindrical section 34 is bonded to the dome core end 32 to insure that the insulation core will fit firmly and securely down on the inner shell 10. After the short cylindrical section 34 is bonded to the end core 32 the then preformed cylindrical section 34 and dome section 32 are attached over the inner shell 10, as best seen in FIGURE 2 and secured thereto by placing 90 degree glass fiber windings 42 over the short cylindrical section 34 securely holding this section of the core onto the inner shell 10.

The next step is to wrap in the insulating core around the remainder of the cylindrical sections 16. Referring now again to FIGURE 1, the cylindrical insulation core 44 may be formed by wrapping a plurality of segments 46 about the cylindrical portion 16 and holding them in place with suitable 90 degree glass windings (not shown). It is to be noted that the core 44 is thus formed of cylindrical segments forming hoops about the inner shell 10. This method of placing the core section 44 is advantageous when the finished tank is to be used in a vertical position as it strengthens the tank in a direction against which the internal pressure will act. However, if the finished tank is to be used in a horizontal position it is preferable to use helically wound insulation strips to increase the resistance to bending movement so as to counteract the pressures involved in a horizontal tank. Thus, and referring to FIGURES 2 and 6, a strip of insulation material 48 is utilized wherein a diagonal cut is made along the line 50. This divides the strip into first and second end transitional end pieces 52 and 54. In addition, cuts are made across the lines 56 and 58 at the wide end of each of the transitional strips 52 and 54 in a line perpendicular to the diagonal line 50. The first transition end piece 52 is placed on one end of the cylindrical core 16 as best seen in FIGURE 2.

Thereafter, the additional strips of insulating material 60 may be helically wound thereon without any cutting and the first one of which will butt up to and align with the cut line 56 on the first transition piece. It is also to be noted that this type of helical winding will avoid any waste as it will not be necessary to cut off the ends of the segments 60 as would be the case if they were used in straight 90 degree windings such as the insulation segments 46 in FIGURE 1. The second transition piece 54 may be suitably laid onto the cylindrical section 16 of the inner shell and adjacent the short cylindrical section 34 at the end opposite the first transition piece 52. The transition pieces 52 and 54 and the intermediate segment 60 are held in place on the inner shell 10 by means of dry glass roving 62 preferably helically wound about the cylindrical insulation core 64.

At this point in the process the core 12 is now complete on the inner shell 10.

Referring now to FIGURE 4 the outer shell 14 is conventionally wound over the insulation core 12 under tension by helically winding a plurality of glass fibers 66 which pass through a resin bath 68 such as on a carriage 70 which longitudinally moves relative to the tank while it is suitably rotated (not shown). However, the outer shell 14 is wound to the desired thickness and since the filaments 66 are wound under tension, the insulation core 12 is firmly pulled against the inner shell 10 as the outer shell 14 is wound thereby forming a firm sandwich construction which greatly assists in the overall strength of the tank.

After the winding of the outer shell 14 is completed the tank is ready for curing. As previously mentioned if the inner insulation is of a honeycomb type cellular construction the completed tank is placed in an oven and fully cured. However, if a foam plastic material is used, the tank is cured at ambient temperatures in order to prevent vapors being formed in the insulation core 12 which cause material separation and weakening of the structural strength of the tank.

In the event that a flat end enclosure is desired instead of the dome shaped enclosure shown in FIGURES 1–4, a flat end enclosure may be constructed as best seen in FIGURE 7. In this event, the inner shell 72 is constructed as before of a helically wound resin impregnated glass fiber. Instead of a dome shape a premolded inner circular top 76 is provided which is suitably bonded to the inner shell 72. Insulating material 78 is bonded to the inside of the outer premolded and preformed top 80 with a suitable adhesive. The inner shell is suitably cured depending upon the type of insulation to be used in the manner previously mentioned. The outside of the inner top 76 is coated with a resin gel coat and the insulation 78 and the top 80 is bonded thereto. The insulating segment 74 may be suitably attached to the inner shell 72 as previously described with the exception that they will overlap the end of the inner shell 72 to form a curved end 82 with the flat end enclosure. The outer shell is then wound by filaments over the insulating segment 74 similar to that shown in FIGURE 4 and the sandwich construction is then suitably cured as before which depends upon the kind of insulation material.

The present invention, therefore, is well suited to carry out the objects and attain the ends and advantages mentioned as well as others inherent therein. While presently preferred embodiments of the invention are given for the purpose of disclosure, numerous changes in the details of construction, and steps of the process may be made which will readily suggest themselves to those skilled in the art and which are encompassed within the spirit of the invention and the scope of the appended claims.

What is claimed is:

1. A method of making an insulated storage tank comprising, helically winding a resin impregnated glass fiber inner shell including a cylindrical section and at least one end section, forming an end core of insulating material to set over the end section, attaching a tubular section of insulating material to said end core, attaching said end core and tubular section on the inner shell, attaching insulation about the cylindrical section, helically winding a resin impregnated glass fiber outer shell under tension over said insulation on the cylinder and end section, and curing the uncured portion of the resulting structure.

2. The method of claim 1 wherein the insulation is attached to the cylindrical section by helically wrapping the insulation about the cylindrical section.

3. The invention of claim 1 wherein said end core is preformed by placing a plurality of segments about a pattern, and joining the segments with a nonrigid connection.

4. The method of claim 1 including the steps of, completely curing the inner shell before attaching the end core and tubular section, and curing the outer shell at ambient temperature.

5. The method of claim 1 wherein the insulating material includes a honeycomb construction and only partially curing the inner shell before attaching the insulation thereto, and curing the outer shell in an oven.

6. The method of making an insulated storage tank comprising, helically winding a resin impregnated glass fiber inner shell including a cylindrical section and at least one arcuate end section, curing said inner wall to intermdeiate cure, forming an end core of honeycomb insulating material to fit over the end section, attaching a tubular section of honeycomb insulating material to said end core, attaching said end core and tubular section on the inner shell, attaching honeycomb insulation about the remainder of the cylindrical wall, helically winding a resin impregnated glass fiber outer shell under tension over said insulation on said cylinder and said end section, and placing the insulated tank in an oven to cure completely.

7. A method of making an insulated storage tank comprising, helically winding a resin impregnated glass fiber inner shell including a cylindrical section and at least one arcuate end section, fully curing the inner shell, forming an end core of rolled insulating material to fit over the end section, bonding a tubular section of rolled insulating material to said end core, attaching said bonded end core and tubular section on the inner shell, attaching rolled insulation about the remainder of the cylindrical section, helically winding a resin impregnated glass fiber outer shell under tension over the insulation on the cylinder and the end section, and fully curing the outer shell, and curing the outer shell at ambient temperatures.

8. The invention of claim 7 wherein said end core is preformed by placing a plurality of segments about a pattern, and joining the segments with a nonrigid connection.

9. The method of making an insulated storage tank using sandwich construction comprising, helically winding a resin impregnated glass fiber inner shell including a cylindrical section and at least one arcuate end section, curing said inner shell, forming an end core of insulating material to fit over the arcuate end section, bonding a short tubular section of insulating material to said end core, placing said end core and tubular section on the inner shell, holding said end core and tubular section in place on the inner shell by placing a band of glass strands about the tubular section, attaching insulation about the cylindrical section, holding said insulation onto the cylindrical section by bands of glass fibers, helically winding a resin impregnated glass fiber outer shell under tension over the insulation on the cylinder and the end section, and curing the outer shell.

10. The invention of claim 9 wherein the insulation is helically placed about the cylindrical wall.

11. The method of making an insulated storage tank using sandwich construction comprising, helically winding a resin impregnated glass fiber inner shell including a cylindrical section and at least one dome shaped end section, curing the inner shell, preforming the core of insulating material for contouring over the dome section, forming a short cylindrical section of insulating material sized to fit around the cylindrical section of the inner shell, bonding the short cylindrical section to the dome shaped insulating material section, placing the short cylindrical and domed sections of insulated material over the inner shell and attaching them thereto by winding glass fibers around the cylindrical section, cutting a diagonal line across a rectangular section of insulating material forming first and second pie shaped transition pieces, placing each of said pie shaped transition pieces on the inner cylindrical shell at each end, helically wrapping segments of insulating material about the inner cylindrical shell and securing them thereto by wrapping with glass fibers, helically winding a resin impregnated glass fiber outer shell under tension over the insulation of said cylindrical and domed sections, and curing the outer shell.

12. The invention of claim 11 wherein the wide ends of the transition pieces are cut perpendicular to the diagonal line.

13. A method of making an insulated storage tank comprising, helically winding a resin impregnated glass fiber inner cylindrical shell, attaching a premolded inner shell end to the shell, curing said inner shell, bonding insulating material to the inside of an outer preformed shell end, attaching outer shell end and the bonded insulating material to the inner shell end, attaching insulation material to the cylindrical shell, helically winding a resin impregtnated glass fiber outer cylindrical shell under tension over the insulation on the cylindrical inner shell, and curing the outer shell.

14. The invention of claim 13 in which the insulation includes honeycomb insulation and wherein the curing of the inner shell is only partial, and curing of the outer shell in an oven.

15. The invention of claim 14 wherein the curing of the inner shell is complete before attaching the insulation thereto, and curing of the outer shell is performed at ambient temperatures.

16. A method of making an insulated storage tank comprising, providing a resin impregnated glass fiber inner shell including a cylindrical section and at least one end section, forming an end core of insulating material to set over the end section, attaching a tubular section of insulating material to said end core, attaching said end core and tubular section on the inner shell, attaching insulation about the cylindrical section, providing a resin impregnated glass fiber outer shell over said insulation on the cylinder and end section, and curing the uncured portions of the resulting structure.

References Cited

UNITED STATES PATENTS

| 317,530 | 5/1885 | Grubb | 156—91 |
| 2,555,380 | 6/1951 | Stuart et al. | 156—69 XR |
| 2,682,491 | 6/1954 | Hahn | 156—197 XR |
| 3,000,433 | 9/1961 | Kemper | 156—91 XR |
| 2,984,379 | 5/1961 | Borzsel et al. | 220—3 XR |
| 3,024,938 | 3/1962 | Watter | 220—3 XR |
| 3,266,660 | 8/1960 | Ragettli | 220—73 |

EARL M. BERGERT, *Primary Examiner.*

D. J. FRITSCH, J. P. MELOCHE, *Assistant Examiners.*